United States Patent
Lee-Baron et al.

(10) Patent No.: US 10,191,729 B2
(45) Date of Patent: Jan. 29, 2019

(54) SYSTEM AND METHODOLOGY FOR UPDATING INDIVIDUALIZED SYSTEM DATA TO FACILITATE REPAIR AND/OR REPLACEMENT SERVICE PROVISION

(71) Applicant: Lenovo Enterprise Solutions (Singapore) Pte. Ltd., Singapore (SG)

(72) Inventors: Jennifer J. Lee-Baron, Morrisville, NC (US); Nathan J. Peterson, Oxford, NC (US); John Scott Crowe, Durham, NC (US); Amy Leigh Rose, Chapel Hill, NC (US); Bryan L. Young, Tualatin, OR (US)

(73) Assignee: Lenovo Enterprise Solutions (Singapore) Pte. Ltd, Singapore (SG)

( * ) Notice: Subject to any disclaimer, the term of this patent is extended or adjusted under 35 U.S.C. 154(b) by 10 days.

(21) Appl. No.: 14/936,484

(22) Filed: Nov. 9, 2015

(65) Prior Publication Data

US 2017/0131992 A1    May 11, 2017

(51) Int. Cl.
| G06F 8/65 | (2018.01) |
|---|---|
| G06F 9/4401 | (2018.01) |
| G06F 8/61 | (2018.01) |

(52) U.S. Cl.
CPC .............. *G06F 8/65* (2013.01); *G06F 8/61* (2013.01); *G06F 9/4401* (2013.01)

(58) Field of Classification Search
None
See application file for complete search history.

(56) References Cited

U.S. PATENT DOCUMENTS

| 5,822,581 | A * | 10/1998 | Christeson | G06F 15/7814 |
| | | | | 712/E9.007 |
| 5,953,515 | A * | 9/1999 | Coteus | G06F 13/4081 |
| | | | | 710/16 |
| 9,110,679 | B1 * | 8/2015 | Chan | G06F 9/4411 |
| 2003/0158870 | A1 * | 8/2003 | Goodman | G06F 17/30371 |
| 2010/0094949 | A1 * | 4/2010 | Goodman | G06F 11/1464 |
| | | | | 709/213 |
| 2012/0303940 | A1 * | 11/2012 | Grice | G06F 8/665 |
| | | | | 713/1 |
| 2013/0013759 | A1 * | 1/2013 | Austen | G06F 15/161 |
| | | | | 709/223 |
| 2013/0254759 | A1 * | 9/2013 | Xu | G06F 8/61 |
| | | | | 717/174 |

(Continued)

*Primary Examiner* — Kim Huynh
*Assistant Examiner* — Danny Chan
(74) *Attorney, Agent, or Firm* — Zilka-Kotab, P.C.

(57) ABSTRACT

A method includes: determining whether individualized system data are one or more of: installed on, associated with, and up-to-date with respect to a computer system and/or a hardware component of the computer system; and in response to determining the individualized system data are one or more of: not installed on, not associated with, and not up-to-date with respect to the computer system and/or the hardware component, one or more of: installing the individualized system data to one or more of the computer system and the hardware component; associating the individualized system data with one or more of the computer system and the hardware component; and updating out-of-date individualized system data of one or more of the computer system and the hardware component. Corresponding systems and computer program products are also disclosed.

13 Claims, 4 Drawing Sheets

(56) References Cited

U.S. PATENT DOCUMENTS

| | | | |
|---|---|---|---|
| 2014/0122857 A1* | 5/2014 | Wall | G06F 9/4403 713/2 |
| 2015/0278055 A1* | 10/2015 | Dang | G06F 11/006 710/19 |
| 2017/0109046 A1* | 4/2017 | Bender | G06F 3/0604 |

* cited by examiner

SYSTEM AND METHODOLOGY FOR UPDATING INDIVIDUALIZED SYSTEM DATA TO FACILITATE REPAIR AND/OR REPLACEMENT SERVICE PROVISION

FIELD OF THE INVENTION

The present invention relates to updating individualized system data, and more particularly, this invention relates to facilitating the provision of repair/replacement services for computer systems by updating individualized system data.

BACKGROUND

Conventionally, when a computer system experiences a failure, and particularly a hardware failure such as a motherboard failure, a service person may travel to the site where the computer system is located to provide repair and/or configuration services and restore the computer to full function. These repairs may include replacing the physical component with a same or compatible model of component.

The damaged hardware typically has associated therewith a dataset including "vital product data" (VPD) that is useful in the context of identifying the particular hardware component and/or computer system in which the hardware component was installed. The VPD is essential to efficient and accurate provision of services according to a service plan, warranty, etc. to which the particular hardware component and/or computer system are subject.

When the service person replaces the hardware component, they must manually install the VPD to the component or system after installation is complete, so that the VPD is associated with the replacement component or system, and appropriate services may be provided with respect to the component or system going forward. In conventional approaches, this requires the service person to utilize an external tool to accomplish the VPD installation.

In practice the service technician often forgets or otherwise fails to complete the requisite installation of VPD to the replaced component and/or system. As a result, subsequent events requiring provision of services may be frustrated or defeated, due to difficulty in determining the appropriate service contract, warranty, or other service-related agreements associated with the replaced component and/or system.

For instance, a component or system may be entitled to certain services under a contract or warranty, but since the VPD is not installed to, or otherwise associated with, the component and/or system, a customer-owner of the component and/or system may experience significant difficulty in obtaining those services to which they are entitled under the agreement, warranty, etc.

Accordingly, it would be beneficial to provide systems, methods, computer program products and the like which avoid the problems associated with service technician failure to manually install VPD with a serviced component and/or system.

SUMMARY

In one embodiment, a system includes: a computer hardware component comprising an embedded storage module; wherein the embedded storage module is configured to implement a routine stored thereon; and wherein the routine is configured to perform one or more of installing, updating, and associating individualized system data with one or more of the system and the computer hardware component.

In another embodiment, a method includes: determining whether individualized system data are one or more of: installed on, associated with, and up-to-date with respect to a computer system and/or a hardware component of the computer system; and in response to determining the individualized system data are one or more of: not installed on, not associated with, and not up-to-date with respect to the computer system and/or the hardware component, one or more of: installing the individualized system data to one or more of the computer system and the hardware component; associating the individualized system data with one or more of the computer system and the hardware component; and updating out-of-date individualized system data of one or more of the computer system and the hardware component.

In yet another embodiment, a computer program product includes: a computer readable medium having stored thereon computer readable program instructions configured to cause a processor of a computer system to: determine whether individualized system data are one or more of: installed on, associated with, and up-to-date with respect to either the computer system or a hardware component of the computer system; and in response to determining the individualized system data are one or more of: not installed on, not associated with, or not up-to-date with respect to the computer system and/or the hardware component, one or more of: install the individualized system data to one or more of the computer system and the hardware component; associate the individualized system data with one or more of the computer system and the hardware component; and update out-of-date individualized system data of one or more of the computer system and the hardware component.

Other aspects and advantages of the present invention will become apparent from the following detailed description, which, when taken in conjunction with the drawings, illustrate by way of example the principles of the invention.

DETAILED DESCRIPTION

Figure 1:
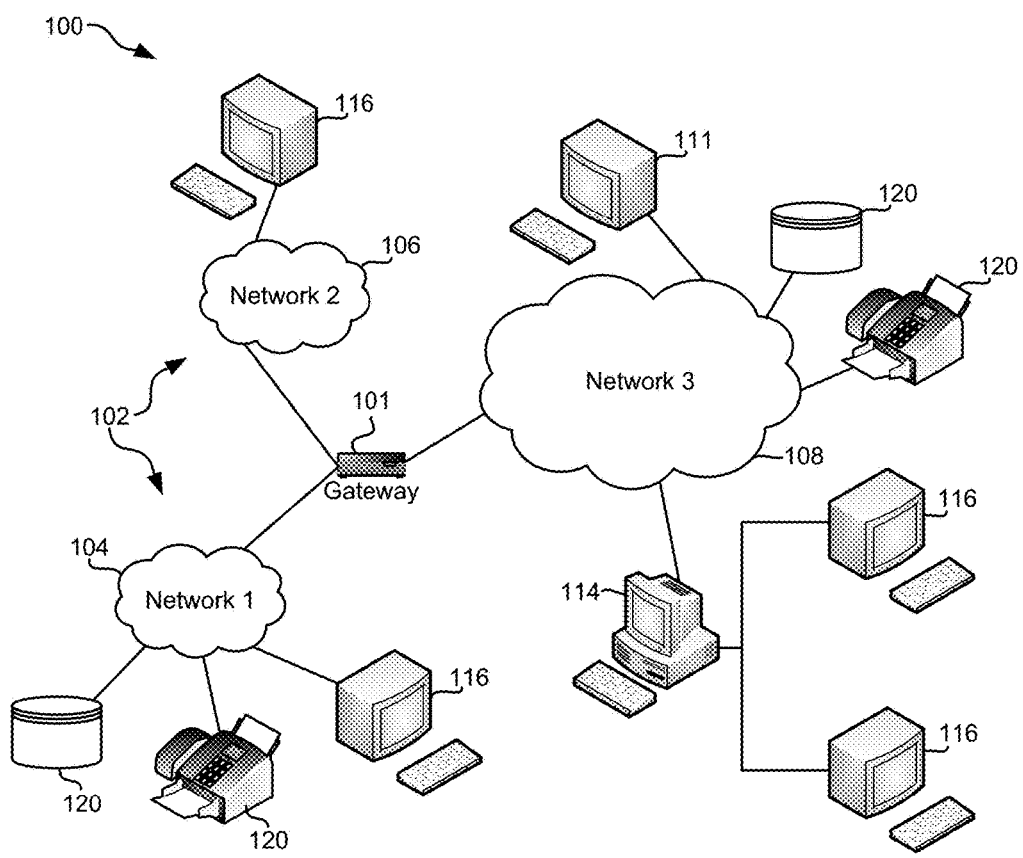
FIG. 1 is a schematic drawing of a computer network environment, according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and techniques configured to ensure individualized system data are properly installed, associated, and/or updated with respect to a particular computer system and/or particular hardware component(s) of the computer system, as well as related systems and methods.

In one general embodiment, a system includes: a computer hardware component comprising an embedded storage module; wherein the embedded storage module is configured to implement a routine stored thereon; and wherein the routine is configured to perform one or more of installing, updating, and associating individualized system data with one or more of the system and the computer hardware component.

In another general embodiment, a method includes: determining whether individualized system data are one or more of: installed on, associated with, and up-to-date with respect to a computer system and/or a hardware component of the computer system; and in response to determining the individualized system data are one or more of: not installed on, not associated with, and not up-to-date with respect to the computer system and/or the hardware component, one or more of: installing the individualized system data to one or more of the computer system and the hardware component; associating the individualized system data with one or more of the computer system and the hardware component; and updating out-of-date individualized system data of one or more of the computer system and the hardware component.

In yet another general embodiment, a computer program product includes: a computer readable medium having stored thereon computer readable program instructions configured to cause a processor of a computer system to: determine whether individualized system data are one or more of: installed on, associated with, and up-to-date with respect to either the computer system or a hardware component of the computer system; and in response to determining the individualized system data are one or more of: not installed on, not associated with, or not up-to-date with respect to the computer system and/or the hardware component, one or more of: install the individualized system data to one or more of the computer system and the hardware component; associate the individualized system data with one or more of the computer system and the hardware component; and update out-of-date individualized system data of one or more of the computer system and the hardware component.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
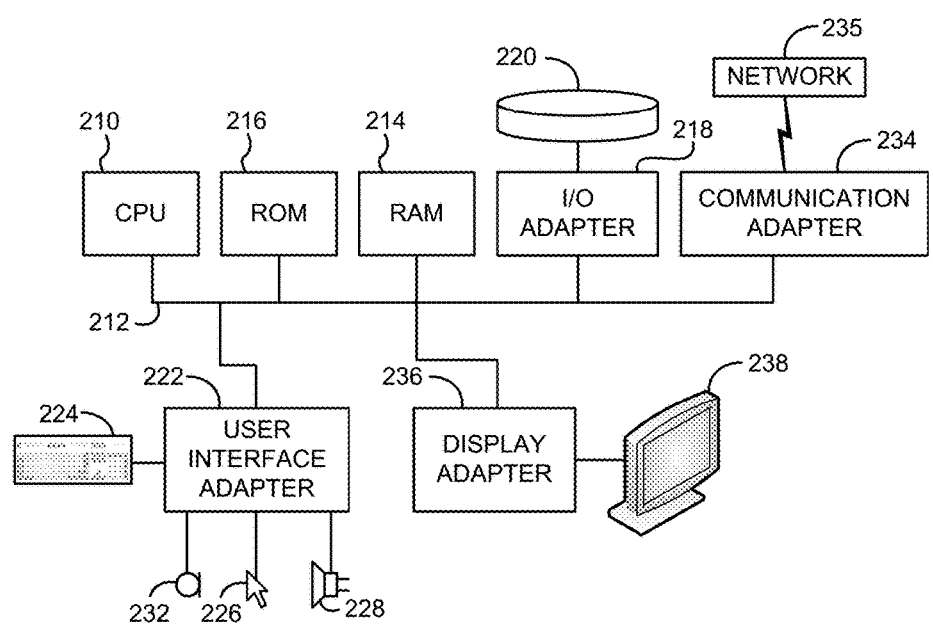
FIG. 2 depicts a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Updating Individualized System Data

As noted above, conventional computer systems suffer from reliance on human actors to manually install or update individualized system data such as VPD in the course of performing services such as repair or replacement of system components, or even the entire computer system.

Inevitably the human actors fail to perform the requisite installation or update, frustrating or defeating the customer-owner's ability to procure subsequent services for that component or system to which they may be entitled under a warranty, service agreement, insurance policy, or other contractual agreement, etc. as would be understood by one having ordinary skill in the art upon reading the present descriptions.

For instance, in one approach a service technician replaces a motherboard or other field replaceable unit (FRU) of a computer system. To ensure VPD is properly installed with, updated, or associated with the FRU, the technician must download a separate, external utility such as an advance settings utility (ASU) or VPD update utility. The technician must download the utility to a key, and use the key to program the VPD accordingly. As this is a manual process, it is often omitted, causing the FRU to be unassociated with the appropriate VPD.

When a customer subsequently wishes to obtain service, or wishes to track their assets using asset tag information, the FRU without associated VPD may be untraceable using the asset tracking system, and/or result in the denial of services or accrual of charges for services to which the customer is entitled and/or has already paid under a service agreement, etc. as would be understood by a person having ordinary skill in the art upon reading the present descriptions.

Unsurprisingly, the foregoing problems frequently result in customer satisfaction issues arising out of non- or poorly functioning asset tracking systems, customer service programs, etc.

Accordingly, several of the presently disclosed inventive embodiments focus on providing solutions that relieve the need to rely on human actors, and ensure that individualized system data are installed to, associated with, updated on, etc. the requisite hardware component, system, etc. as would be understood by one having ordinary skill in the art upon reading the present descriptions.

More particularly, many of the presently disclosed inventive concepts provide hardware- and software-based solutions that ensure individualized system data are present in the capacity necessary to facilitate efficient, accurate provision of services to which the customer-owner of the hardware needing service is entitled.

Individualized system data, in various embodiments, may include any type of system data that identifies a particular computer system and/or hardware component included with a computer system. In preferred embodiments, individualized system data includes VPD.

As understood herein, VPD may include any form of data suitable for purposes of identifying the particular component and/or system, and preferably VPD includes at least one unique identifier comprising a string that identifies the computer system for purposes of facilitating service and repair.

In more preferred embodiments, VPD may include one or more of: a system and/or component manufacturer name; a system and/or component serial number; a system and/or component type; a universally unique identifier (UUID); and/or asset tag information. In particularly preferred embodiments, the VPD includes all of the above data points.

The manufacturer name may include the name of the commercial entity, individual, etc. responsible for manufacturing the system and/or component. The name may be substantially identical to a corporate entity, such as LENOVO®, in some approaches. In more approaches, the manufacturer name may be the name of an individual, if the system was manufactured by an individual rather than a corporate entity.

In even more embodiments, the manufacturer name may include additional identifying information beyond the name of a corporate entity or individual, such as information identifying a particular facility where a corporate entity or individual maintains multiple manufacturing facilities. The additional information may specify the particular location, e.g. a city, state, or country name, and/or may be in the form of a string associated with the particular location or facility.

The system and/or component serial number may include any suitable form of serial number as would be understood by one having ordinary skill in the art upon reading the present descriptions. In preferred approaches, the serial number is an uninterrupted string of alphanumeric characters excluding special characters, spaces, etc. as would be understood by a skilled artisan upon reading the present disclosure.

The system type and/or component type, for example, may include and/or refer to the model number and/or name of the system or component, a model name, or any other suitable information to identify the particular type of device, e.g., according to its configuration of components as opposed to identifying the individual piece of hardware or individual system.

In additional approaches, the UUID may include any suitable identifier, e.g. a string, which uniquely identifies the particular hardware component and/or system being serviced or replaced. Preferably, the UUID is a 128-bit value, and in various exemplary embodiments may include one or more of a MAC address, DCE security value, MD5 hash, SHA-1 hash, date and time information, and/or namespace information, etc. as would be understood by one having ordinary skill in the art upon reading the present descriptions. Of course, other forms of UUID that would be appreciated by a skilled artisan as suitable upon reading these descriptions may be employed without departing from the scope of the present disclosure.

In even more approaches, the asset tag information may include a string encoded as a barcode on a physical tag or label applied to the hardware component and/or system. The asset tag information preferably identifies the particular hardware component and/or information as property of the customer-owner. Accordingly, multiple assets of the customer-owner may have attached thereto asset tags depicting the same or similar asset tag information, so long as the asset tag information uniquely identifies the owner of the asset(s).

Additionally and/or alternatively, VPD may include one or more unique strings which are associated with and/or otherwise identify the manufacturer name, system and/or component serial number, system and/or component type; UUID and/or asset tag information rather than expressly including the manufacturer name, system and/or component serial number, system and/or component type; UUID and/or asset tag information.

In various embodiments, the presently disclosed inventive concepts solve the problems identified above by leveraging embedded space on a hardware component and/or system, particularly FRU motherboards. For instance, in one approach a boot time routine may be implemented. In other approaches, storage such as an embedded multimedia card (EMMC) may be coupled to the hardware component and/or system, and the embedded storage may implement a routine to update VPD as part of a boot process. Of course, the boot time routine and embedded storage embodiments may be combined without departing from the scope of the present disclosures, in more approaches.

Importantly, the presently disclosed inventive concepts enable the installation, update, association, etc. of VPD and other individualized system data with the system and/or hardware component without the need for an external utility.

Figure 3:
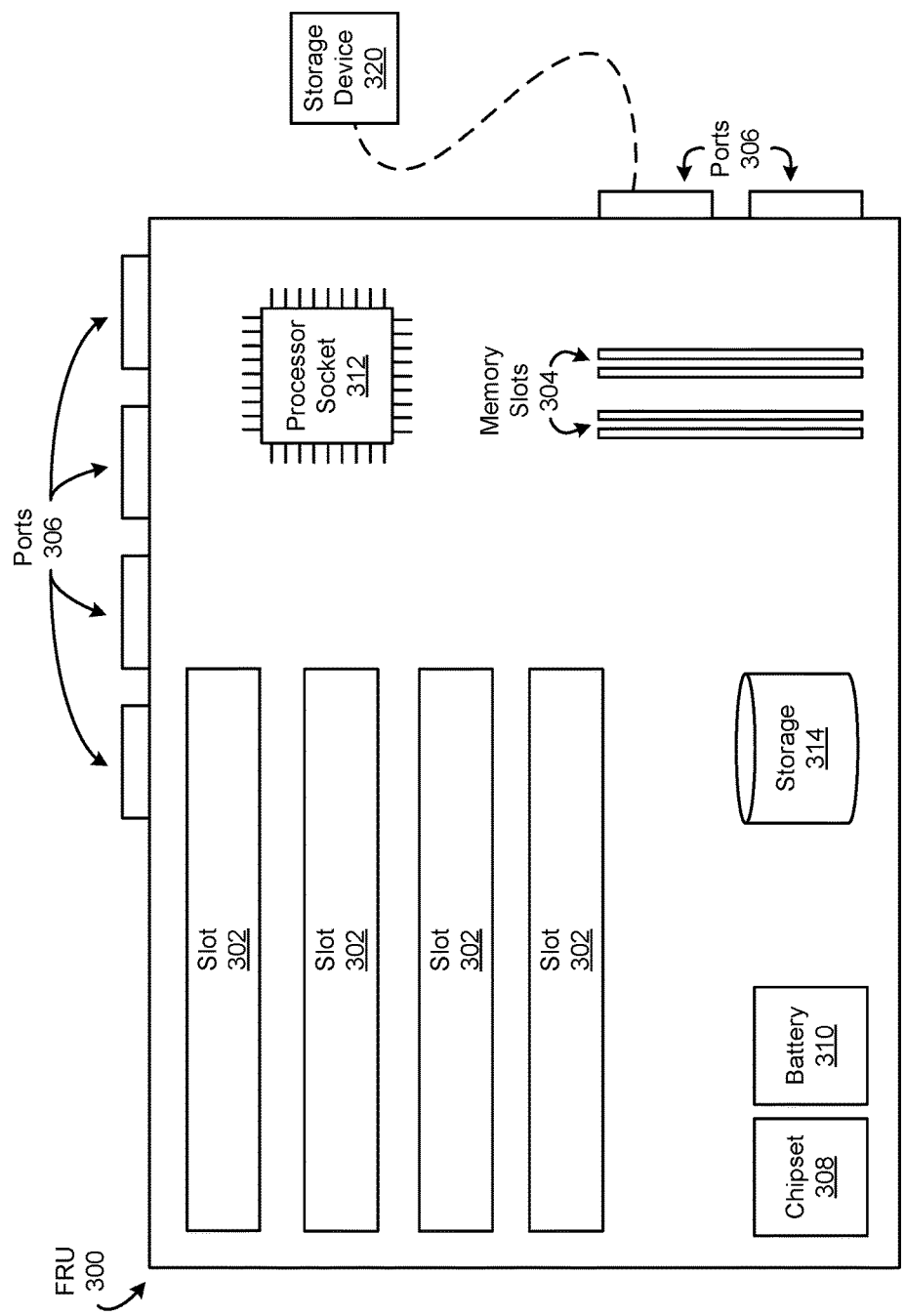
FIG. 3 depicts a simplified schematic of a field replaceable unit (FRU), according to one embodiment.

For instance, and with reference to FIG. 3, a FRU 300 is shown, according to one embodiment. The FRU 300 is configured to determine whether VPD are installed to and/or associated therewith, and whether any installed or associated VPD are up-to-date. The FRU 300 is further configured to install, update, associate, etc. VPD and/or other individualized system data with the FRU 300.

As shown in FIG. 3, the FRU 300 comprises a plurality of components configured to facilitate conventional computer system functions. For instance, FRU 300 includes a plurality of slots 302 configured to couple with one or more removable hardware components such as peripheral component interconnect express (PCIe) cards.

FRU 300 also includes a plurality of memory slots 304 configured to couple with one or more removable memory modules such as dual in-line memory modules (DIMMs).

FRU 300 further includes a plurality of ports 306 which may include, for example, universal serial bus (USB) ports, audio ports, serial ports, parallel ports, serial AT attachment (SATA) ports, and the like, as would be understood by a person having ordinary skill in the art upon reading the present descriptions.

With continuing reference to FIG. 3, FRU 300 may include a chipset 308 and/or battery 310, as would be understood by a person having ordinary skill in the art upon reading the present descriptions.

Further still, as shown in FIG. 3 the FRU 300 includes at least one processor socket 312, which may be configured to couple with a processor such as a central processing unit (CPU), graphics processing unit (GPU), or any other type of suitable processing unit as would be understood by a person having ordinary skill in the art upon reading the present descriptions.

In preferred approaches, the FRU 300 is coupled to a storage device 320 via one of the ports 306. The storage device 320 may include any type of storage device suitable for implementing at least a file system, and preferably an operating system, thereon.

In addition, and by way of contrast from the components configured to facilitate conventional computer system functions as described immediately above, FRU 300 includes an embedded storage 314. The embedded storage is configured to determine whether VPD are installed to or otherwise associated with the FRU 300, and whether VPD installed to and/or associated with the FRU 300 are up-to-date. The embedded storage 314 is further configured to install, update, associate, etc. VPD and/or other individualized system data to the FRU 300.

In preferred approaches, the embedded storage 314 comprises an embedded multimedia card (EMMC) having stored thereon computer readable program instructions configured to implement a routine involving the FRU 300 and/or storage device 320 of a computer system in which the FRU 300 and/or storage device 320 are installed.

In particular, the embedded storage 314 is preferably configured to implement the routine upon, and/or in response to determining a boot process initiation. The routine is configured to use other components of the FRU 300, and/or other hardware components coupled to the FRU 300, e.g. storage device 320 and/or a processor (not shown) as would be understood by a person having ordinary skill in the art upon reading the present descriptions, in order to accomplish the functionality described herein.

In practice, the routine includes determining whether individualized system data are one or more of: installed on, associated with, and up-to-date with respect to either a computer system or a hardware component of the computer system, preferably the FRU 300. In various approaches, individualized system data may include any suitable type of data described herein, but preferably include VPD.

The individualized system data may be considered "installed on" a component when those data are stored on a memory module of the component, e.g. an embedded memory module as opposed to a removable memory module, in preferred approaches.

Individualized system data, in additional and/or alternative approaches, may be considered "associated with" a particular component when those data are stored on a memory module to which the particular component is coupled, whether physically, electrically, wirelessly, etc. as would be understood by one having ordinary skill in the art upon reading the present descriptions. For instance, in one embodiment individualized system data being stored on a memory of storage device 320 is sufficient to consider FRU 300 "associated with" those individualized system data.

In some approaches, the memory module to which the particular component is coupled may require physical coupling in order for the correspondingly stored individualized system data to be considered "associated" therewith. Other types of couplings, and or physical embedding of the memory module storing the individualized system data may be required to satisfy the definition of "association" according to other embodiments, without departing from the scope of the present disclosures.

Similarly, in more approaches individualized system data may be considered "up-to-date" or "updated" with respect to a particular hardware component when those data accurately and uniquely reflect the hardware component identity.

In this context, accuracy is particularly important with respect to the type of component, the identity of the owner of the computer system in which the component is installed, the type and/or the identity of the computer system in which the component is installed, in preferred approaches. Uniqueness is particularly important with respect to the identity of the owner of the computer system in which the component is installed, and/or the identity of the computer system in which the component is installed, in more preferred approaches.

Of course, accuracy and uniqueness of individualized system data are generally important to the extent necessary to provide accurate services to a component, system, and or system owner according to entitlements of the component, system, and/or owner, e.g., entitlements conveyed by a warranty, by law, by contract, etc. as would be understood by one having ordinary skill in the art upon reading the present descriptions.

For instance, in one embodiment a particular hardware component of a computer system requires replacement. Individualized system data are preferably but not necessarily installed on a replacement component, and may also be installed on one or more other components such as a storage device coupled to the computer system. Upon installing the replacement component, individualized system data installed on the other component(s) may no longer accurately and/or uniquely reflect the identity of the replacement component. Accordingly, the individualized system data are not "up-to-date" with respect to the replacement component and should preferably be updated.

Similarly, upon removing the damaged component, and installing the replacement component, it may be necessary, and is of practical advantage, to install individualized system data accurately and uniquely reflecting the replacement component identity to other components coupled to the computer system, e.g. the storage device mentioned above. For example, if individualized system data installed on the replacement component become overwritten, lost or corrupt, the individualized system data may be recovered from the other component(s).

In order to address situations where individualized system data such as VPD are not installed to, not associated with, and/or not up-to-date with respect to a particular component, system, etc., the routine also includes, in response to determining the individualized system data are either not installed on, not associated with, or not up-to-date with respect to either the computer system or the hardware component, one or more of: installing the individualized system data to the computer system or the hardware component; associating the individualized system data with the computer system or the hardware component; and updating out-of-date individualized system data of the computer system or the hardware component.

Accordingly, in various approaches, implementing the routine may involve determining whether the embedded storage module 314 has stored thereon individualized system data such as VPD. In response to determining the embedded storage module 314 does not include individualized storage data thereon, the missing individualized storage data may be copied to the embedded storage module 314 from another component having the individualized storage data thereon and to which the embedded storage module 314 is communicatively coupled. Preferably, the other component(s) include a storage device such as storage device 320, and the individualized system data are stored in a file system implemented via the storage device 320.

Similarly, in response to determining the embedded storage module 314 has stored thereon individualized system data, the routine may include determining whether individualized system data match individualized system data stored on another component of the computer system, such as stored in file system implemented via a storage device 320 of the computer system.

In response to determining the individualized system data installed on the hardware component such as the embedded storage module 314 do not match individualized system data stored on the file system of the computer system, the routine may include overwriting the individualized system data.

Depending on the situation, it may be advantageous to overwrite the individualized system data on the FRU 300 in some approaches (or equivalently the embedded storage module 314), while in other situations it may be more advantageous to overwrite individualized system data stored on the other component (e.g. storage device 320).

For instance, after a replacement component is installed in a preexisting computer system, it may be advantageous to rely on the individualized system data stored on the file system, particularly where likelihood is high that a particular component will be replaced with an identical type of component. In embodiments where the individualized system data uniquely identify a system as a whole, or an owner of one or more computer systems, as opposed to uniquely identifying a particular component, this approach of relying on individualized system data stored on the file system as a reference is particularly appropriate and advantageous.

On the other hand, where different types (e.g., models) of a similar component (e.g., different brands of hard drive, or similarly configured FRUs) may be involved in a repair/replacement process it may be more advantageous to rely on individualized system data stored on the replacement component, since a mismatch is likely due to a genuine difference between the "old" and "new" individualized system data. Accordingly, in these approaches the individualized system data stored on the replacement component serves as the reference.

As noted above, the routine may be advantageously implemented at boot time to ensure that individualized system data are installed, associated, and/or updated in an automated manner, without requiring any action by a user, a technician, etc.

In more embodiments, the routine may be implemented as an option in a boot menu such as a basic input/output system (BIOS), whether provided via a command-line interface (CLI) or graphical user interface (GUI). For instance in one embodiment the routine may be implemented via a target disk mode (TDM) function of a boot menu. By implementing the routine in this manner, the conventional need to obtain a separate utility to update or install individualized system data may be eliminated. The presently disclosed inventive concepts may therefore also include user-mediated or other forms of manual implementation of the routine, in various approaches.

In still more approaches, the routine may be automatically or manually implemented as part of a startup process of one or more software applications, preferably an OS, instead of or in addition to being implemented at the boot process level. This implementation may be particularly advantageous where, for example, a user may request service or replacement using an application or tool relying on the OS environment. By ensuring that all individualized system data are installed, associated, updated, etc. as a part of the startup process, those data necessary for the service process are ensured to be present when the user initiates the service request using the service application or tool.

Figure 4:
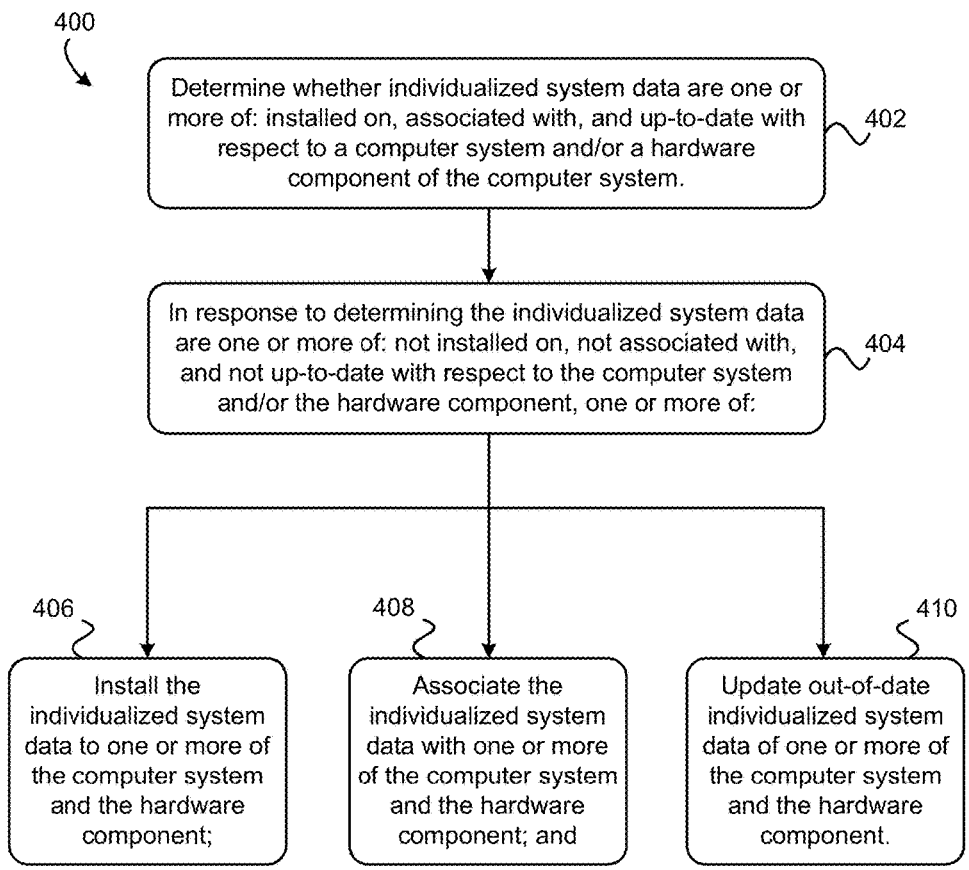
FIG. 4 shows a flowchart of a method, according to one approach.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a determination is made as to whether individualized system data are installed on, associated with, and/or up-to-date with respect to either a computer system as a whole, and/or one or more hardware components of the computer system. Preferably, the determination is made with respect to a hardware component of the computer system, and that hardware component is or includes a FRU motherboard.

Method 400 also includes operation 404, where, in response to determining individualized system data are either not installed on, not associated with, or not up-to-date with respect to the computer system and/or the hardware component, one or more of operations 406-410 are performed according to the particular situation at hand.

For instance, in response to determining data are not installed as expected, data may be installed in an operation 406, in one embodiment. Individualized system data may be installed using any suitable technique disclosed herein without departing from the scope of the present disclosures.

In more embodiments, and in response to determining data are not associated with a hardware component or system as expected, in operation 408 an association between the component/system and the individualized system data may be established, for example by creating and/or updating a reference pointer stored on the component or system, the reference pointer pointing to the associated individualized system data.

In still more embodiments, method 400 may include an update operation 410 to remedy problems associated with individualized system data which is present (e.g. installed) but inaccurate. In general, operation 410 involves updating out-of-date individualized system data of the computer system or the hardware component. In some approaches, it may be necessary or advantageous to determine whether individualized system data are out-of-date.

Accordingly, operation 410 may include, in some approaches, determining whether individualized system data installed on one or more of the computer system and the hardware component (e.g. a newly installed FRU) match individualized system data stored elsewhere (e.g. on a file system implemented via a storage device) on the computer system. In response to determining the individualized system data installed on the computer system and/or the hardware component do not match individualized system data stored elsewhere on the computer system, update operation 410 may include overwriting the individualized system data installed on the computer system and/or the hardware component. These individualized system data may be overwritten with the individualized system data stored elsewhere, e.g. on the file system of the computer system, in various approaches.

In various approaches, the method 400 may include one or more of the above installation, association, and/or update operations 406-410, and these operations may be performed in a specified order, or without any particular order of operation. For instance, it may be advantageous in some approaches to perform an installation according to operation 406, followed by an at least partial update according to operation 410, e.g. to ensure the installed individualized system data match "reference" individualized system data stored elsewhere.

While various embodiments herein have been described from the perspective of individualized system data accurately reflecting the identity of a particular component such as a FRU, it should be understood that in more embodiments the individualized system data may reflect the identity of a computer system as a whole, and/or an owner of a computer system such as a commercial entity. In this manner, valuable information is retained directly on and/or in association with the computer system. As this information is advantageous for purposes of coordinating and providing, e.g., repair and replacement services to computer system owners, the presently disclosed inventive embodiments solve the problem of conventional systems whereby individualized system data are routinely omitted from newly manufactured and/or recently-serviced computer systems.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a storage device hosting a file system and implementing an operating system, the file system storing first individualized system data identifying a computer hardware component;
a replacement computer hardware component comprising an embedded storage module storing second individualized system data identifying the replacement computer hardware component;
wherein the embedded storage module is configured to implement a routine stored thereon using a processor or a controller of the system;
wherein the routine is configured to overwrite the first individualized system data with the second individualized system data in response to determining a mismatch between the first individualized system data and the second individualized system data;
wherein the storage device is physically separate from the computer hardware component and the replacement computer hardware component;
wherein the embedded storage module is configured to automatically implement the routine during a boot process of the system using a target disk mode function of the boot process;
wherein the embedded storage module is further configured to automatically implement the routine as part of a startup process of the operating system;
wherein the first individualized system data and the second individualized system data each comprise vital product data (VPD) corresponding to the computer hardware component; and
wherein the VPD comprises:
a manufacturer name corresponding to the replacement computer hardware component;
a location corresponding to the replacement computer hardware component, wherein the location includes a city name, a state, and a country name;
a serial number corresponding to the replacement computer hardware component, wherein the serial number is an uninterrupted string of alphanumeric characters excluding special characters and spaces;
a component type corresponding to the replacement computer hardware component, wherein the component type comprises a model name;
a universally unique identifier (UUID) corresponding to the replacement computer hardware component, wherein the UUID is a 128-bit value selected from the group consisting of: a MAC address: a DCE security value, a MD5 hash, and a SHA-1 hash; and
asset tag information corresponding to the replacement computer hardware component, wherein the asset tag information is a string encoded as a barcode on a physical tag applied to the replacement computer hardware component.

2. The system as recited in claim 1, wherein the replacement computer hardware component comprises a field replaceable unit (FRU) motherboard; and
wherein the embedded storage module comprises an embedded multimedia card (EMMC) embedded on the FRU.

3. The system as recited in claim 1, wherein the routine is configured to:
determine whether the second individualized system data are: installed on, associated with, and/or up-to-date with respect to the system; and
in response to determining the individualized system data are: not installed on, not associated with, and/or not up-to-date with respect to the system:
install the second individualized system data to the system;
associate the second individualized system data with the system; or
install the second individualized system data to the system and associate the second individualized system data with the system.

4. The system as recited in claim 1, wherein the second individualized system data includes a component type corresponding to the replacement computer hardware component; and
wherein the component type comprises a model name of the replacement computer hardware component.

5. The system as recited in claim 1, wherein the routine is configured to:
determine whether the second individualized system data are: installed on, associated with, and/or up-to-date with respect to the system; and
in response to determining the individualized system data are: not installed on, not associated with, and/or not up-to-date with respect to the system:
install the second individualized system data to the system;
associate the second individualized system data with the system; or
install the second individualized system data to the system and associate the second individualized system data with the system; and
wherein the computer hardware component comprises a first field replaceable unit (FRU) motherboard;
wherein the replacement computer hardware component comprises a second FRU motherboard;

wherein the embedded storage module comprises an embedded multimedia card (EMMC) embedded on the second FRU;

wherein the embedded storage module is further configured to automatically implement the routine as part of an operating system startup process.

6. A method, comprising:

determining whether first individualized system data stored on a storage device of a computer system and corresponding to a computer hardware component previously installed in the computer system are up-to-date, based on:

comparing the first individualized system data to second individualized system data stored on an embedded storage module of a replacement computer hardware component; and in response to determining the individualized system data are not up-to-date, overwriting the first individualized system data with the second individualized system data;

wherein the storage device hosts a file system and implements an operating system of the computer system;

wherein the first individualized system data are stored on the file system;

wherein the storage device is physically separate from the computer hardware component and the replacement computer hardware component;

wherein each of the first individualized system data and the second individualized system data comprise vital product data (VPD); and wherein the VPD comprises:

a manufacturer name corresponding to the replacement computer hardware component;

a location corresponding to the replacement computer hardware component, wherein the location includes a city name, a state, and a country name;

a serial number corresponding to the replacement computer hardware component, wherein the serial number is an uninterrupted string of alphanumeric characters excluding special characters and spaces;

a component type corresponding to the replacement computer hardware component, wherein the component type comprises a model name;

a universally unique identifier (UUID) corresponding to the replacement computer hardware component, wherein the UUID is a 128-bit value selected from the group consisting of: a MAC address: a DCE security value, a MD5 hash, and a SHA-1 hash; and asset tag information corresponding to the replacement computer hardware component, wherein the asset tag information is a string encoded as a barcode on a physical tag applied to the replacement computer hardware component.

7. The method as recited in claim 6, wherein the overwriting is performed as part of:

a boot process of the computer system; and a startup process of the operating system.

8. The method as recited in claim 6, wherein the overwriting is implemented in a targeted disk mode of a boot menu interface of the computer system.

9. The method as recited in claim 6, wherein the second individualized system data stored on the embedded storage module of the replacement computer hardware component are "reference" individualized system data.

10. A computer program product, comprising: a computer readable storage medium having stored thereon computer readable program instructions configured to cause a processor of a computer system to:

determine whether first individualized system data stored on a storage device of a computer system are up-to-date with respect to either the computer system or a hardware component of the computer system; and in response to determining the first individualized system data are not up-to-date with respect to the computer system or the hardware component:

install second individualized system data, the second individualized system data corresponding to a replacement computer hardware component and stored on an embedded storage module of the replacement computer hardware component;

associate the second individualized system data with the computer system and/or the hardware component; and/or update the first individualized system data of the computer system and/or the hardware component using the second individualized system data; and wherein determining whether the first individualized system data are up-to-date with respect to: the system, the hardware component, or the system and the hardware component comprises comparing the first individualized system data to the second individualized system data;

wherein the storage device hosts a file system and implements an operating system of the computer system;

wherein the first individualized system data are stored on the file system;

wherein the storage device is physically separate from the computer hardware component and the replacement computer hardware component;

wherein the second individualized system data comprises vital product data (VPD), the VPD comprising:

a manufacturer name corresponding to the replacement computer hardware component;

a location corresponding to the replacement computer hardware component, wherein the location includes a city name, a state, and a country name;

a serial number corresponding to the replacement computer hardware component wherein the serial number is an uninterrupted string of alphanumeric characters excluding special characters and spaces;

a type corresponding to the replacement computer hardware component, wherein the type comprises a model name;

a universally unique identifier (UUID) corresponding to the replacement computer hardware component, wherein the UUID is a 128-bit value selected from the group consisting of: a MAC address: a DCE security value, a MD5 hash, and a SHA-1 hash; and an asset tag information corresponding to the replacement computer hardware component, wherein the asset tag information is a string encoded as a barcode on a physical tag applied to the replacement computer hardware component.

11. The computer program product as recited in claim 10, wherein the computer readable storage medium comprises an EMMC embedded on a FRU motherboard.

12. The computer program product as recited in claim 10, wherein the first individualized system data are stored on the file system of the computer system,
   wherein the file system resides on a storage device communicatively coupled to the computer system.

13. The computer program product as recited in claim 10, wherein the update is performed as part of:
   a boot process of the computer system; and
   a startup process of an operating system installed on the computer system.

\* \* \* \* \*